(12) United States Patent
Takao

(10) Patent No.: US 8,422,255 B2
(45) Date of Patent: Apr. 16, 2013

(54) POWER CONVERTER WITH OSCILLATION CONTROL PART AND METHOD FOR CONTROLLING THE SAME

(75) Inventor: Kazuto Takao, Ibaraki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 138 days.

(21) Appl. No.: 12/876,762

(22) Filed: Sep. 7, 2010

(65) Prior Publication Data

US 2011/0222321 A1    Sep. 15, 2011

(30) Foreign Application Priority Data

Mar. 10, 2010    (JP) .................. 2010-053286

(51) Int. Cl.
*H02M 5/458* (2006.01)
*H02M 7/95* (2006.01)

(52) U.S. Cl.
USPC ............................................. 363/39; 363/46

(58) Field of Classification Search ............ 363/39, 363/40, 46
See application file for complete search history.

(56) References Cited

U.S. PATENT DOCUMENTS 4,131,864 A * 12/1978 Kuzumoto et al. ..... 331/116 FE

FOREIGN PATENT DOCUMENTS

| JP | 56-86031 | 7/1981 |
| JP | 2007-006658 | 1/2007 |
| JP | 2009-159707 | 7/2009 |

OTHER PUBLICATIONS

Japanese Office Action issued Nov. 29, 2011, in Patent Application No. 2010-053286 (with English-language translation).

* cited by examiner

*Primary Examiner* — Adolf Berhane
*Assistant Examiner* — Nusrat Quddus
(74) *Attorney, Agent, or Firm* — Oblon, Spivak, McClelland, Maier & Neustadt, L.L.P.

(57) ABSTRACT

An oscillation control part composed of a control switching element and a damping resistance connected in parallel is arranged between an input power supply and a main switching element of a power conversion circuit, and the control switching element and the main switching element have a relationship such as $Ron(S2) < E(Rg) \times fsw/(D \times I^2)$, and the main switching element is turned off and after a current of the main switching element has become zero, the control switching element is turned off to prevent a high-frequency oscillation generated between a parasitic inductance of the circuit and a junction capacitance of the main switching element, with a damping resistance.

7 Claims, 6 Drawing Sheets

POWER CONVERTER WITH OSCILLATION CONTROL PART AND METHOD FOR CONTROLLING THE SAME

CROSS-REFERENCE TO RELATED APPLICATION

This application is based upon and claims the benefit of priority from the prior Japanese Patent applications No.JP2010-053286, filed on Mar. 10, 2010; the entire contents of (all of) which are incorporated herein by reference.

FIELD

Embodiments described herein relate generally to a power converter using a semiconductor element, and a method for controlling the same.

BACKGROUND

Recently, a power converter is required to have a higher power density (power density=output power of a power converter/volume of a power converter). In order to implement the high power density, the power converter is required to be reduced in volume.

A main part of the volume of the power converter is composed of a heat sink and passive components such as a capacitor and inductor, and in order to miniaturize the heat sink, it is necessary to reduce a loss of a power converter and in order to miniaturize the passive component, it is necessary to increase a switching frequency.

The loss of the power converter mostly lies in a loss of a semiconductor element, and recently, a Si super junction MOSFET (hereinafter referred to as the SiC-MOS) and a SiC MOSFET (hereinafter, referred to as the SiC-MOS) are expected as semiconductor elements capable of lowering the loss.

Since each of the SJ-MOS and the SiC-MOS is a unipolar device in which a carrier to carry a current in a semiconductor is only composed of an electron, its switching speed is high as compared with an IGBT which is a bipolar device in which a carrier is composed of an electron and a hole. Since the high-speed switching can reduce a switching loss, a switching frequency can be increased.

FIG. 2 shows a voltage waveform of a drain-source voltage at the time of a turn-off of the SJ-MOS with an inductive load. At the time of the turn-off, the drain-source voltage rises, and when it reaches Vdc, a voltage oscillates.

This oscillation is generated between a parasitic inductance of a circuit and a junction capacitance of the SJ-MOS, and attenuated by a parasitic resistance of the circuit. At this time, energy accumulated in the parasitic inductance of the circuit is consumed by the parasitic resistance.

The parasitic inductance of the circuit is typically in the order of several tens of nH to several hundreds of nH, and the junction capacitance of the semiconductor element is in the order of several hundreds of pF to several nF, so that a frequency of the oscillation is as high as in the order of several tens of MHz, which causes the problem that it becomes a high-frequency noise source.

Oscillation is suppressed by reducing the switching speed. To reduce the switching speed has been attempted by increasing a gate resistance connected to the semiconductor element.

However, when the switching speed is reduced by the above means, a increase in voltage between the drain and the source of the main switching element and a reduction in drain current of the main switching element are delayed, and as a result, the switching loss problematically increases.

DETAILED DESCRIPTION

An embodiment provides a power converter capable of reducing a loss of a switching element, while preventing a high-frequency oscillation due to a parasitic inductance of a circuit and a junction capacitance of the switching element.

The power converter according to this embodiment to attain the above object is provided by connecting an input power supply of a power conversion circuit, an oscillation control part composed of a control switching element and a damping resistance connected in parallel, and a main switching element in a form of a circuit loop, in which the control switching element and the main switching element have a relationship such as $Ron(S2) < E(Rg) \times fsw/(D \times I^2)$, and the device further includes a timing control device to control respective gate voltages of the main switching element and the control switching element in such a manner that the main switching element is turned off and after a current of the main switching element has become zero, the control switching element is turned off.

With the above configuration, the high-frequency oscillation can be immediately attenuated by a damping resistance. In addition, since the switching speed can be increased, the switching loss can be reduced. That is, a high-frequency noise can be reduced and a loss can be reduced.

[First Embodiment]

A description will be made of a power converter according to a first embodiment with reference to the drawings.

Figure 1:
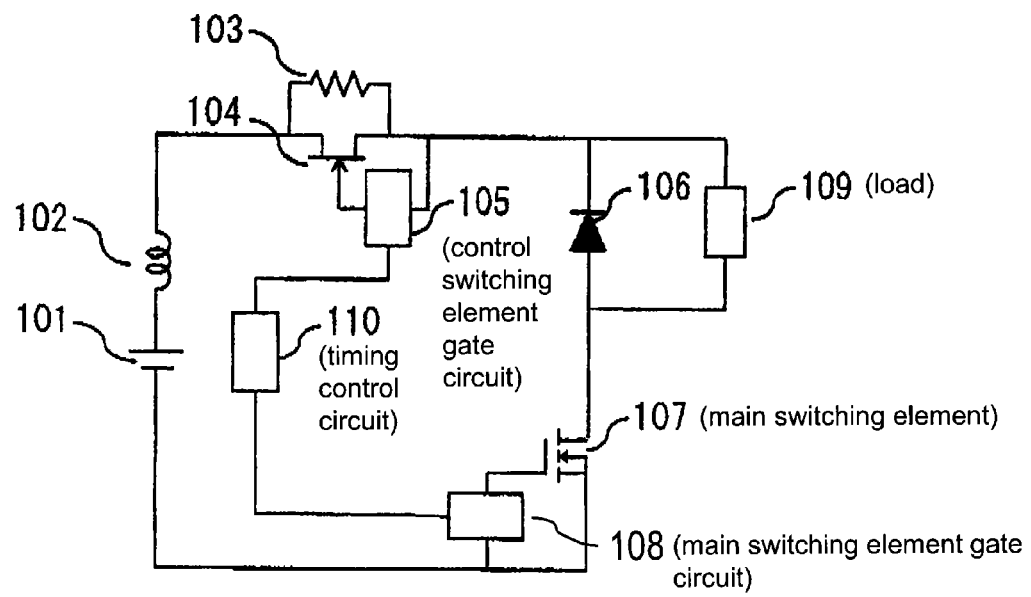
FIG. 1 is an equivalent circuit diagram of a power conversion device according to a first embodiment.
Figure 2:
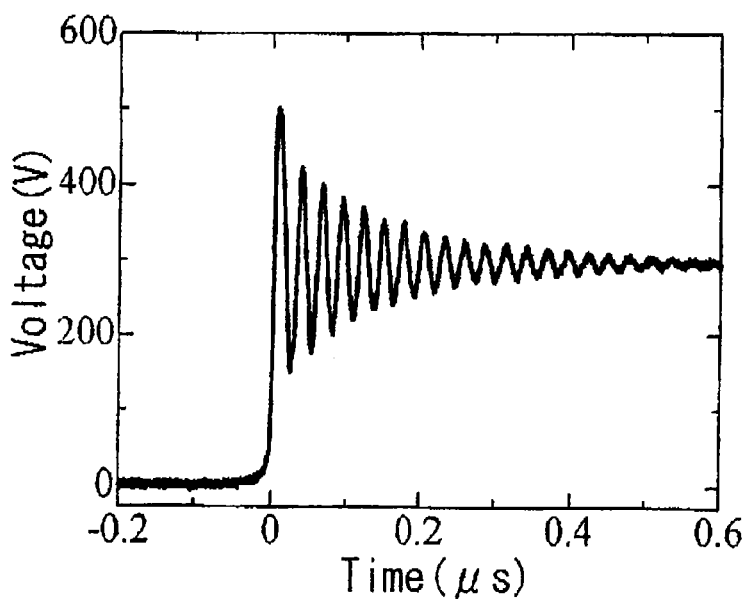
FIG. 2 is a switching waveform diagram of a super junction MOSFET.

FIG. 1 is an equivalent circuit of the power converter according to the first embodiment. A control switching element 104 and a damping resistance 103 are connected in parallel, and set in a circuit loop composed of an input power supply 101, a free wheel diode 106, and a main switching element 107. The control switching element 104 is driven by a control switching element gate circuit 105, and the main switching element 107 is driven by a main switching element gate circuit 108. In addition, the control switching element gate circuit 105 and the main switching element gate circuit 108 are turned on and turned off by a timing control circuit 110.

Figure 3:
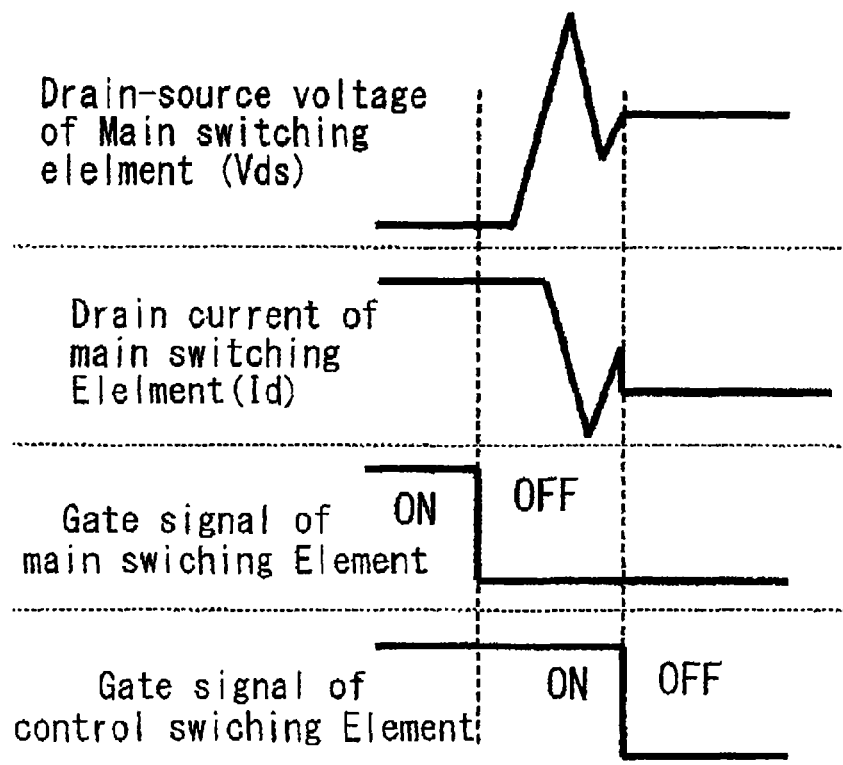
FIG. 3 is a diagram showing voltage and current waveforms of a main switching element, and gate signal timings of the main switching element and a control switching element.

FIG. 3 shows behaviors of waveforms and a gate signal of the main switching element, and a gate signal of the control switching element. When the gate signal of the main switching element is changed from on state to off state, a drain-source voltage Vds of the main switching element starts rising. When the voltage Vds becomes equal to a value Vdc of an input DC power supply, a drain current Id of the main switching element starts decreasing.

When the current Id becomes zero, a current flowing in a channel part of the main switching element 107 becomes zero, and LC resonance is generated between a parasitic inductance 102 and parasitic capacitance (not shown) of the main switching element 107 shown in FIG. 1. This resonance is generated in the circuit loop composed of the DC power supply 101, the parasitic inductance 102, the control switching element 104, the free wheel diode 106, and the main switching element 107. Load 109 is connected in parallel with free wheel diode 106.

After the current has become zero, the gate signal of the control switching element 104 is changed from on state to off state, and the control switching element 104 is turned off. That is, the timing control circuit 110 turns off the main switching element 107 and after a current of the main switching element 107 has become zero, it turns off the control switching element 104.

By the above operation, the circuit loop is formed of the DC power supply 101, the parasitic inductance 102, the damping resistance 103, the freewheel diode 106, and the main switching element 107, and the resonance is prevented by the damping resistance 103.

Figure 4:
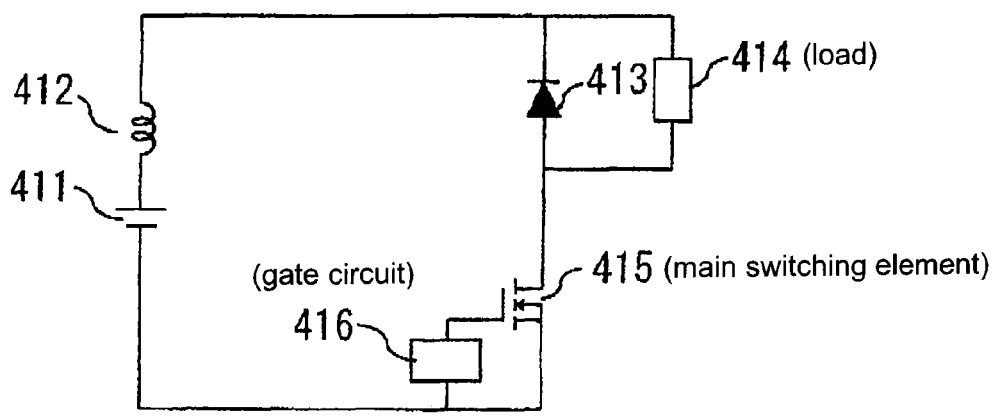
FIG. 4 is an equivalent circuit diagram of a normal chopper circuit.

Next, a description will be made of a loss-reduction effect provided in this embodiment. FIG. 4 shows a chopper circuit as an example of the power conversion device. The chopper circuit is composed of an input power supply 411, a parasitic inductance 412 of the circuit, a free wheel diode 413, a main switching element 415, a gate circuit 416, and a load 414.

A loss of the main switching element in the chopper circuit in FIG. 4 is expressed by an equation 1.

$$P_1 = D \cdot R_{on}(S1) \cdot I^2 + (E(R_g) + E_{oss}) \cdot f_{sw}$$ [Equation 1]

wherein a first term represents a conduction loss, and a second term represents a switching loss on the right side, D: duty of the main switching element (ratio of on-period in one cycle),
$R_{on}(S1)$: on resistance of the main switching element,
I: a load current of the chopper circuit,
$E(R_g)$: switching energy depending on a gate resistance of the main switching element,
$E_{oss}$: energy accumulated in junction capacitance of the main switching element, and
$f_{sw}$: a switching frequency.

Regarding the power conversion device in the embodiment, the control switching element is in on state during the same period as an on period of the main switching element, and the conduction loss is generated in the control switching element during this period.

In addition, the fact that the E (Rg) in the equation 1 can become zero by setting a mirror period of the main switching element to zero has been confirmed in an experiment by the inventor.

At this time, a sum of the losses of the control switching element and the main switching element is represented by an equation 2.

$$P_2 = D \cdot (R_{on}(S1) + R_{on}(S2)) \cdot I^2 + E_{oss} \cdot f_{sw}$$ [Equation 2]

wherein $R_{on}$ (S2): on resistance of the control switching element, and the other parameters are same as those in the equation 1.

In order to reduce the loss by the method of the present embodiment, a relationship of P2<P1 is to be established. When the equation 1 and the equation 2 are substituted into the relationship of P2<P1, the following relational equation is obtained.

$$R_{on}(S2) < \frac{E(R_g) \cdot f_{sw}}{D \cdot I^2}$$ [Equation 3]

A resistance value which satisfies an equation 3 has been studied. A SiC-MOS having a withstand voltage of 1200 V is used as the main switching element and its on resistance is 0.36Ω. The E (Rg) has been measured in an experiment, and it is 100 uJ when a DC voltage is 600 V, and I=7 A. As the other parameters, D=0.5, and $f_{sw}$=100 kHz. When the parameters are substituted into the equation 3, it is found that the Ron(S2) is to be smaller than 0.367 Ω.

Figure 5:
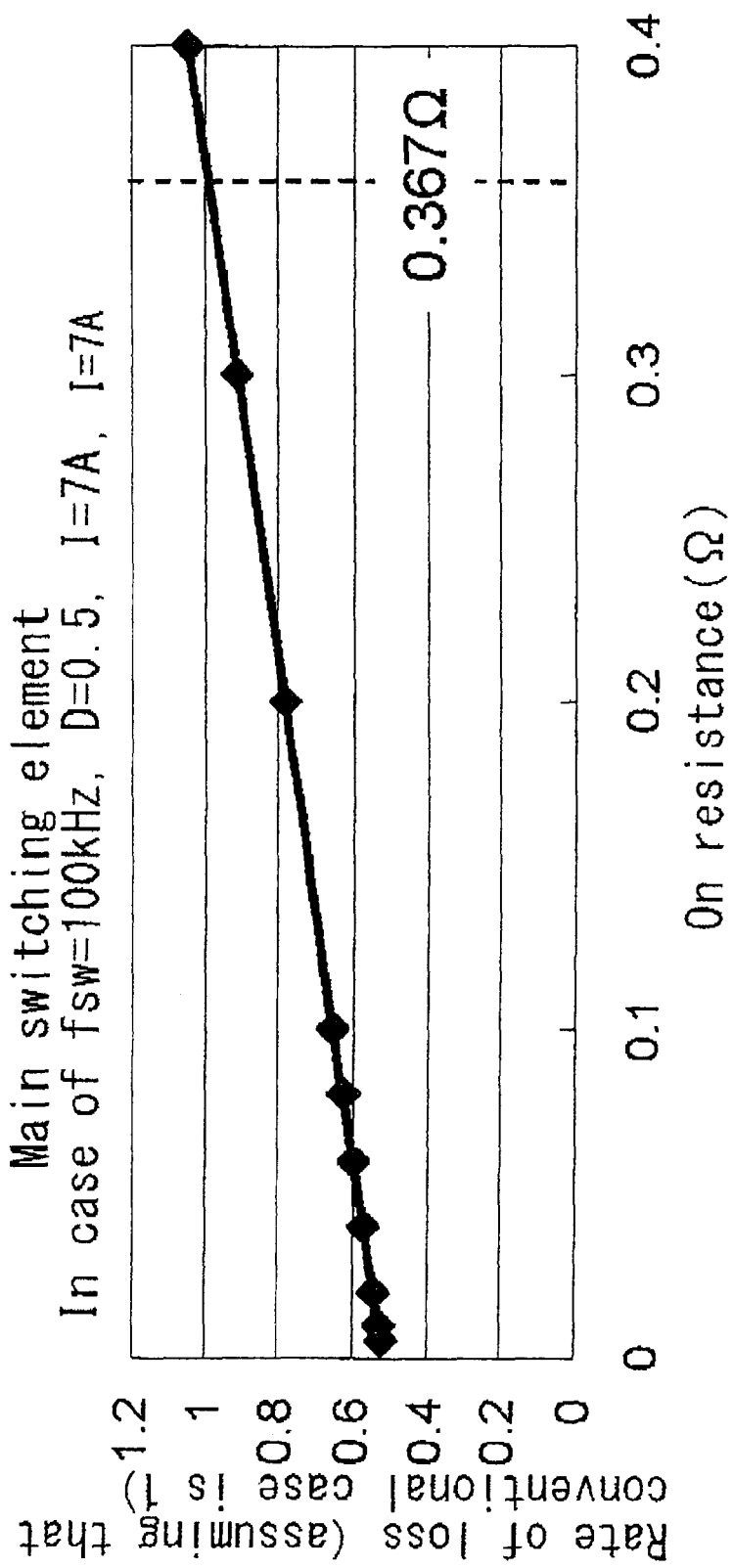
FIG. 5 is a graph showing a rate of a loss of the control switching element with respect to on resistance.

FIG. 5 shows a rate of the loss with respect to the on resistance of the control switching element under the above circuit condition. As obtained in the above calculation, the rate of the loss is 1 when the on resistance of the control switching element is 0.367Ω, that is, it is the same as the conventional loss. In addition, it is found from the drawing that the rate of the loss decreases by decreasing the on resistance of the control switching element to be smaller than 0.367 Ω.

Next, an effect of preventing high-frequency oscillation of this embodiment will be described. The effect is verified by a circuit simulation with an oscillation prevention part and without it.

Figure 6:
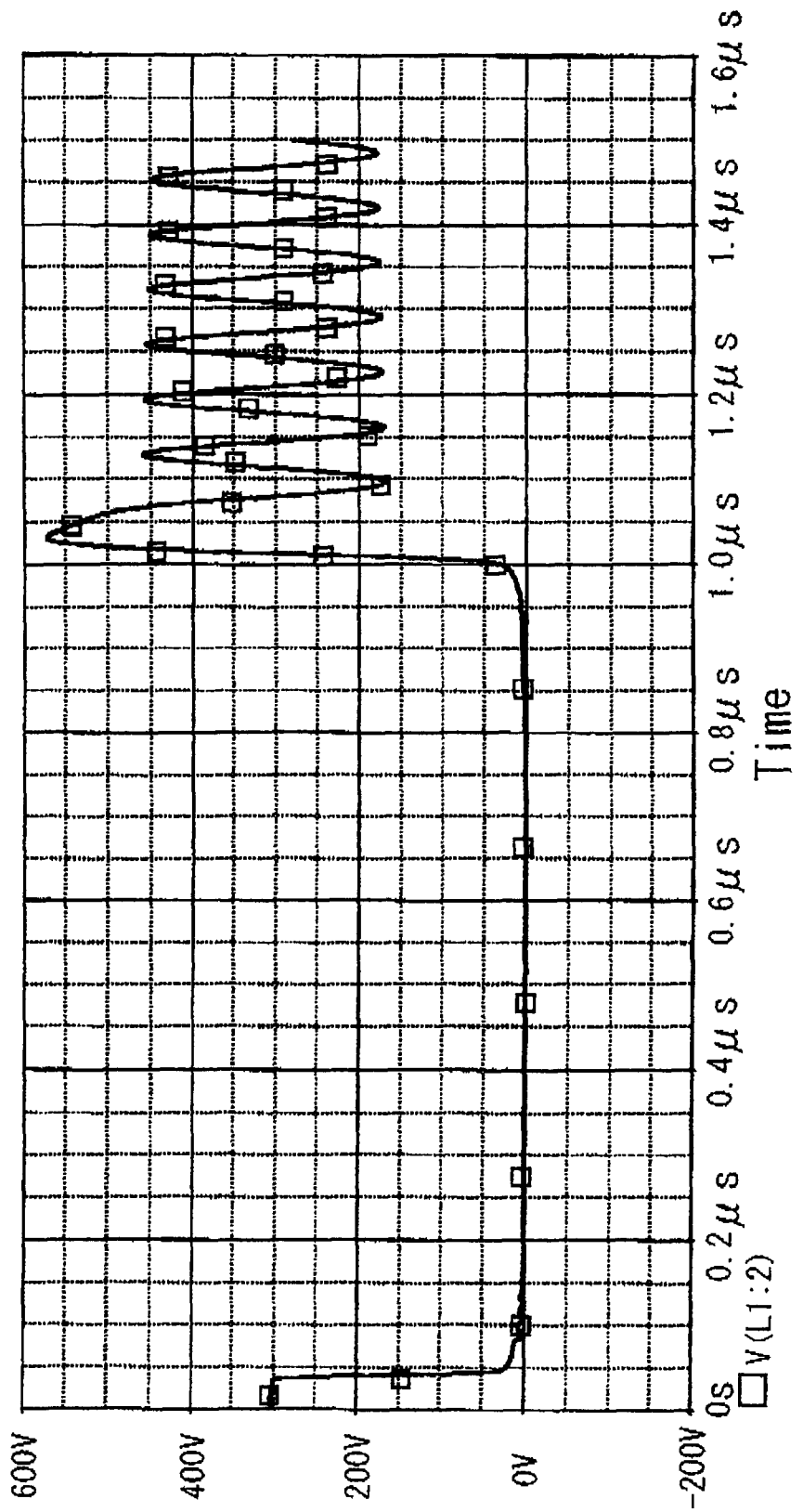
FIG. 6 is a view showing a simulation result of a voltage waveform of a SJ-MOS without an oscillation prevention part.

FIG. 6 shows a voltage waveform of an SJ-MOS without the oscillation prevention part. It has been confirmed that the high-frequency oscillation is generated after the turn-off.

Figure 7:
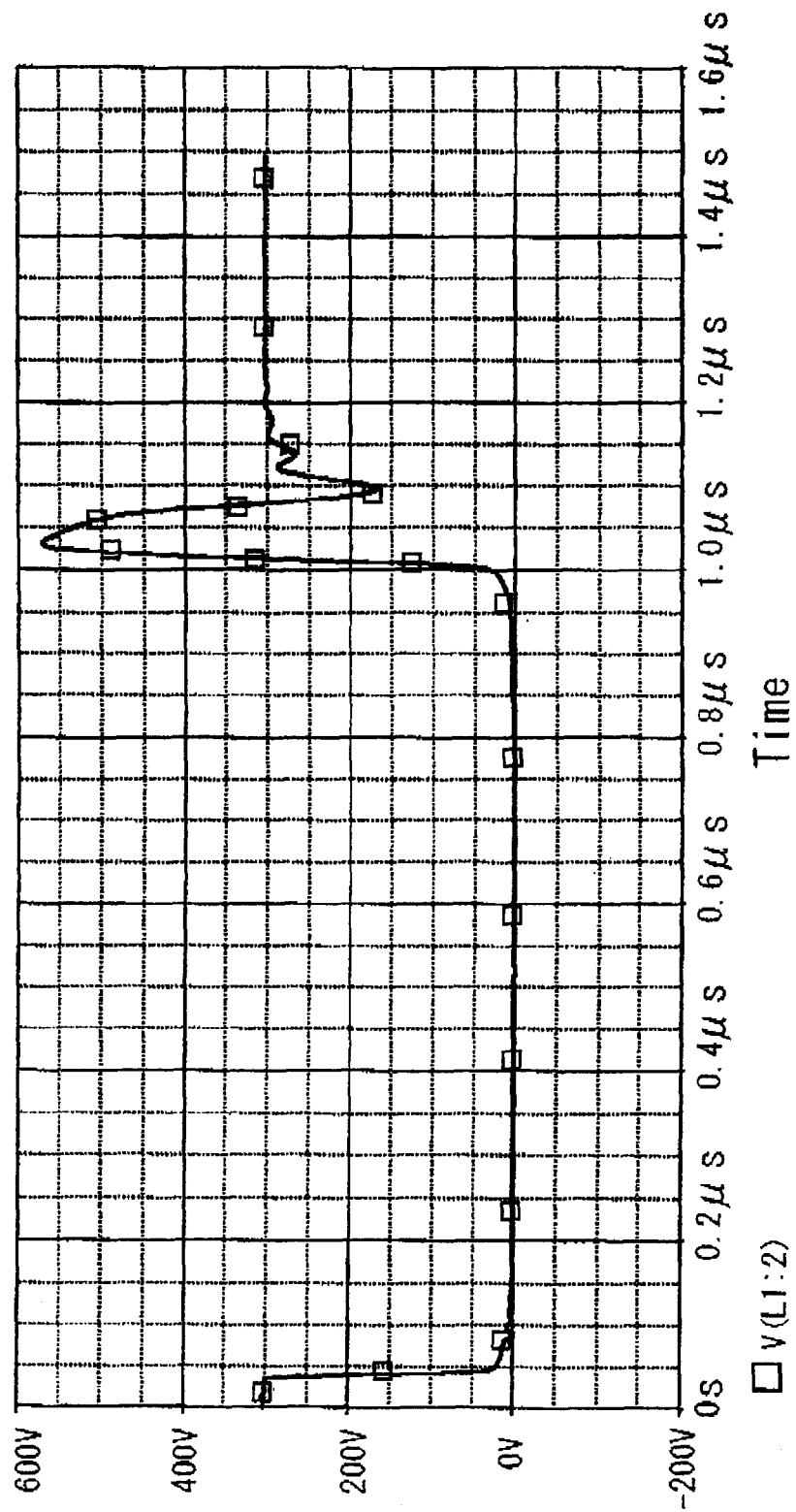
FIG. 7 is a view showing a simulation result of a voltage waveform of the SJ-MOS with the oscillation prevention part according to an embodiment.

FIG. 7 shows a voltage waveform of the SJ-MOS with the oscillation prevention part. It has been confirmed that the high-frequency oscillation is prevented from being generated after the turn-off. Thus, the effectiveness of the present embodiment has been validated.

In addition, it is preferable that an SiC-SITs element is used as the control switching element in the embodiment. When the SiC element is used, an on resistance value per unit area is low as compared with a Si element, and as a result, a small-size circuit can be implemented.

In addition, a GaN-HEMT element may be used instead of the SiC-SITs element. The GaN element is further low in on resistance value as compared with the Si-IGBT element and the SiC element, which is advantageous with a view to reducing the size of the element.

Furthermore, when the Si-IGBT element is used as a material of the control switching element, a circuit having a low on resistance and a high element voltage can be implemented as compared with a Si-SJMOSFET element.

[Second Embodiment]

Next, a description will be made of a converter according to a second embodiment.

Figure 8:
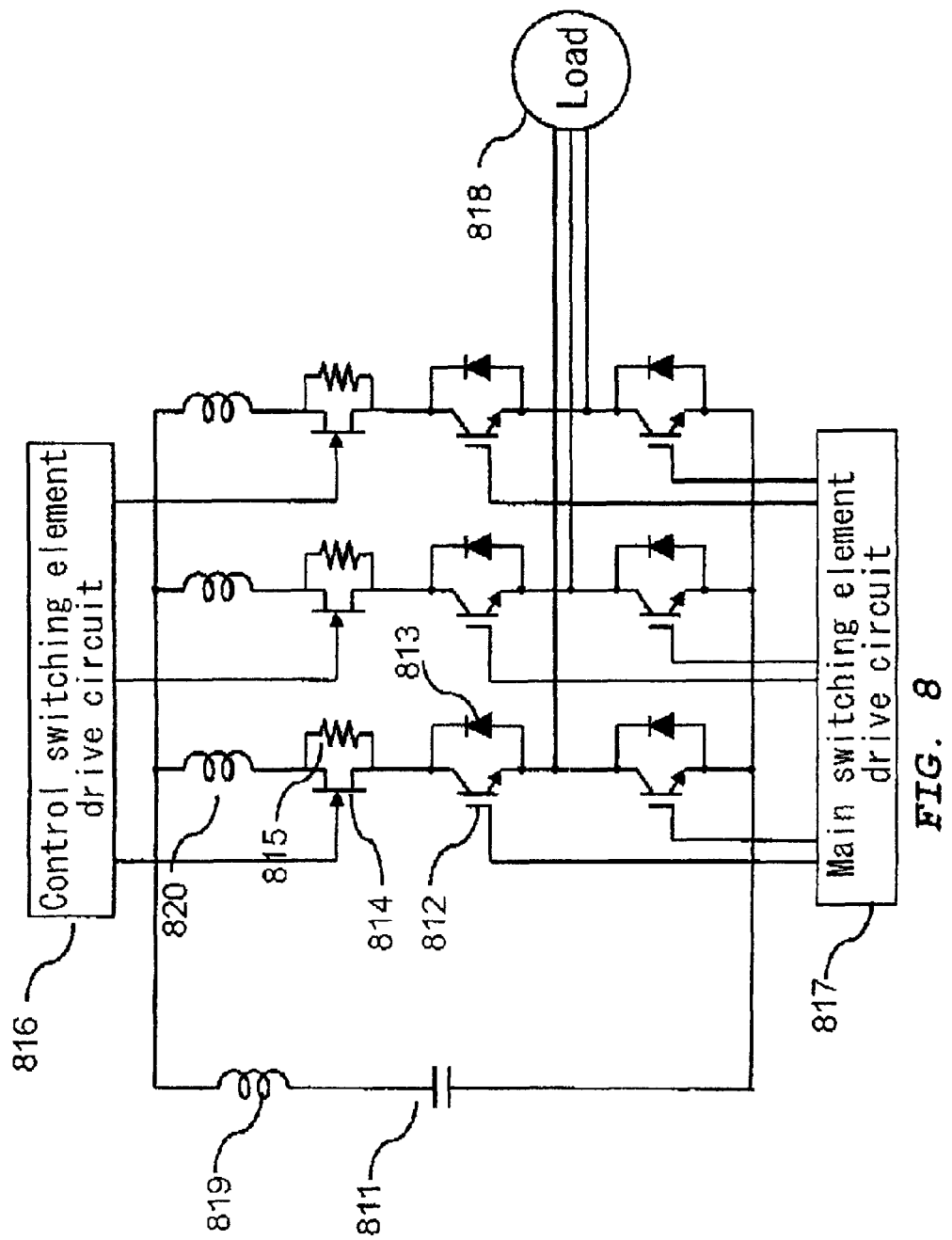
FIG. 8 is an equivalent circuit diagram of an inverter according to a second embodiment.

FIG. 8 shows a three-phase inverter circuit to which an oscillation control part according to this embodiment is applied. This circuit converts an inputted DC power to an AC power using a main switching element 812 and a free wheel diode 813, and supplies it to a load 818. Six main switching elements are used and perform switching operation at a predetermined timing by a main switching element gate circuit 817.

A capacitor 811 is connected to an input side of an inverter, and a parasitic inductance 819 exists in a wiring between the capacitor 811 and each phase. In addition, a parasitic inductance 820 exists in a wiring part of each phase.

A control switching element 814 and a damping resistance 815 serving as an oscillation prevention part are arranged in each phase, and the control switching element 814 is driven by a control switching element gate circuit 816.

The main switching element gate circuit 817 and the control switching element gate circuit 816 perform timing control in such a manner that the main switching element 812 is turned off and after the main switching element current has become zero, the control switching element 814 is turned off by respective timing control circuits (not shown).

While certain embodiments have been described, these embodiments have been presented by way of example only, and are note intended to limit the scope of the inventions. Indeed, the novel device and method described herein may be embodied in a variety of other forms; furthermore, various omissions, substitutions and changes in the form of the device and method described herein may be made without departing from the spirit of the inventions. The accompanying claims and their equivalents are intended to cover such forms or modifications as would fall within the scope and spirit of the inventions.

What is claimed is:

1. A power converter provided by connecting an input power supply of a power conversion circuit, an oscillation control part composed of a control switching element and a damping resistance connected in parallel, and a main switching element in the form of a circuit loop, wherein
   the control switching element and the main switching element have a relationship such as
   $R_{on}(S2) < E(R_g) \times f_{sw} /(D \times I^2)$, where
   D is a duty of the main switching element (ratio of on-period in one cycle),
   $R_{on}(S2)$ is an on resistance of the control switching element,
   I is a load current of a chopper circuit,
   $E(R_g)$ is a switching energy depending on a gate resistance of the main switching element, and
   $f_{sw}$ is a switching frequency, and
   the power converter further comprises a timing control device to control respective gate voltages of the main switching element and the control switching element in such a manner that the main switching element is turned off and after a current of the main switching element has become zero, the control switching element is turned off.

2. The power converter according to claim 1,
   wherein an SiC static induction transistor is used as the control switching element.

3. The power converter according to claim 1,
   wherein a GaN high-electron-mobility transistor is used as the control switching element.

4. The power converter according to claim 1,
   wherein an Si IGBT is used as the control switching element.

5. The power converter according to claim 1,
   wherein a resistance value of a damping resistance is set in such a manner that a relationship such as $R \geq 4L/C$ is established among a resistance value R of the damping resistance, a parasitic inductance L of the circuit, and a junction capacitance C of the main switching element.

6. The power converter according to claim 1,
   wherein an on resistance of the control switching element per unit area is smaller than an on resistance of the main switching element per unit area.

7. A method of controlling a power converter comprising:
   connecting an input power supply of a power conversion circuit, an oscillation control part composed of a control switching element and a damping resistance connected in parallel, and a main switching element in a form of a circuit loop;
   turning off the main switching element of the power conversion device configured in such a manner that the control switching element and the main switching element have a relationship such as $R_{on}(S2) < E(R_g) \times f_{sw}/(D \times I^2)$; where
   D is a duty of the main switching element (ratio of on-period in one cycle);
   $R_{on}(S2)$ is an on resistance of the control switching element;
   I is a load current of a chopper circuit;
   $E(R_g)$ is a switching energy depending on a gate resistance of the main switching element; and
   $f_{sw}$ is a switching frequency;
   and turning off the control switching element after a current of the main switching element has become zero.

* * * * *